United States Patent
Pommeret et al.

(10) Patent No.: US 7,108,411 B2
(45) Date of Patent: Sep. 19, 2006

(54) PIECE OF STYLING AND A MOTOR VEHICLE INCLUDING SUCH A PIECE OF STYLING

(75) Inventors: Maelig Pommeret, Lyons (FR); Gerald Andre, Amberieu en Bugey (FR); Thibault Lacroix, Château-Gaillard (FR)

(73) Assignee: Compagnie Plastic Omnium, Lyons (FR)

( * ) Notice: Subject to any disclaimer, the term of this patent is extended or adjusted under 35 U.S.C. 154(b) by 83 days.

(21) Appl. No.: 10/446,722

(22) Filed: May 29, 2003

(65) Prior Publication Data

US 2004/0042226 A1    Mar. 4, 2004

(30) Foreign Application Priority Data

May 30, 2002    (FR)    ................................ 0206662

(51) Int. Cl.
*B60Q 1/00*    (2006.01)
*G07F 7/12*    (2006.01)

(52) U.S. Cl. ........................ 362/496; 40/591
(58) Field of Classification Search ................ 362/487, 362/540, 311, 812, 496; 40/546, 625–627, 40/643, 644, 591
See application file for complete search history.

(56) References Cited

U.S. PATENT DOCUMENTS

| | | | | |
|---|---|---|---|---|
| 2,169,022 A | * | 8/1939 | Chubb | 40/548 |
| 4,443,832 A | * | 4/1984 | Kanamori et al. | 362/84 |
| 4,977,695 A | * | 12/1990 | Armbruster | 40/541 |
| 5,009,020 A | * | 4/1991 | Watanabe | 40/547 |
| 5,249,104 A | | 9/1993 | Mizobe | 362/31 |
| 5,497,303 A | * | 3/1996 | Decinti et al. | 362/505 |
| 5,939,979 A | * | 8/1999 | Lee | 340/479 |
| 6,076,948 A | * | 6/2000 | Bukosky et al. | 362/494 |
| 6,099,154 A | * | 8/2000 | Olney | 362/494 |
| 6,338,563 B1 | * | 1/2002 | Norman | 362/268 |

FOREIGN PATENT DOCUMENTS

| | | |
|---|---|---|
| EP | 0 791 911 A2 | 8/1997 |
| WO | WO 92/11622 | 7/1992 |

* cited by examiner

*Primary Examiner*—Ali Alavi
(74) *Attorney, Agent, or Firm*—Oliff & Berridge, PLC

(57)    ABSTRACT

A piece of styling for a motor vehicle having an outside skin placed in visible manner on a support of the vehicle. The outside skin has an outside surface that is semi-reflecting so as to allow light to pass through it in one direction only.

6 Claims, 1 Drawing Sheet

Coupe A-A

PIECE OF STYLING AND A MOTOR VEHICLE INCLUDING SUCH A PIECE OF STYLING

The present invention relates to a piece of styling for a motor vehicle, and to a motor vehicle including such a piece of styling.

More precisely, the invention relates to a piece of styling comprising an outside skin placed in visible manner on a support of the vehicle.

BACKGROUND OF THE INVENTION

Such pieces of styling are known in the state of the art. Generally they are placed on the front hood of a motor vehicle and comprise a logo that is distinctive of the trademark of the motor vehicle. In order to make the logo visible, the piece of styling is generally chromium-plated and is thus clearly distinguished from the background on which it is placed, i.e. the front hood of the motor vehicle which is painted some other color.

Nevertheless, depending on outside light levels, and in particular at night, the logo is not always visible.

OBJECT AND SUMMARY OF THE INVENTION

The invention seeks to remedy this drawback by providing a piece of styling for a motor vehicle having improved visibility.

The invention thus provides a piece of styling for a motor vehicle of the above-specified type, wherein the outside skin includes a semi-reflecting outside surface, i.e. it allows light to pass in one direction only.

Thus, if a light source is placed behind the outside skin, the piece of styling is visible even at night so long as the light source is switched on.

The piece of styling of the invention may also comprise one or more of the following characteristics:
 the outside skin is made of a transparent material and has a visible outside surface that is chromium-plated;
 the outside skin has an inside surface opposite from its outside surface and having a surface state that diffuses light;
 the piece of styling comprises a logo; and
 the piece of styling comprises a monogram.

The invention also provides a motor vehicle having a piece of styling as described above.

BRIEF DESCRIPTION OF THE DRAWING

The invention will be better understood on reading the following description, given purely by way of example and made with reference to the accompanying drawing, in which.

MORE DETAILED DESCRIPTION

Figure 1:
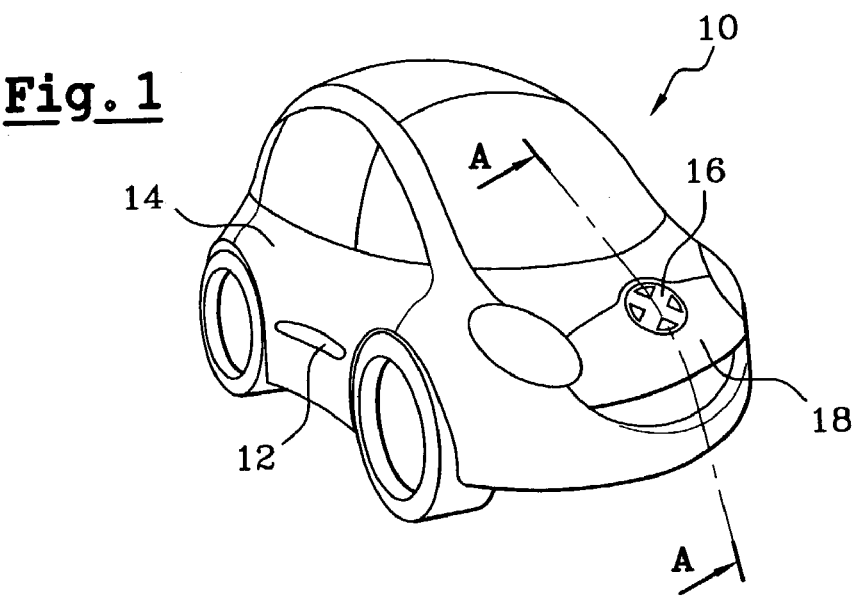
FIG. 1 shows a motor vehicle having two pieces of styling in accordance with the invention.

The motor vehicle 10 shown in FIG. 1 has a first piece of styling 12 disposed on a door 14 of the vehicle.

Similarly, the vehicle 10 has a second piece of styling 16 disposed on a front wall 18 that forms part of the front hood of the motor vehicle 10.

By way of example, the first piece of styling 12 comprises a monogram, while the second piece of styling comprises a logo that is distinctive of the trademark of the motor vehicle 10.

Figure 2:
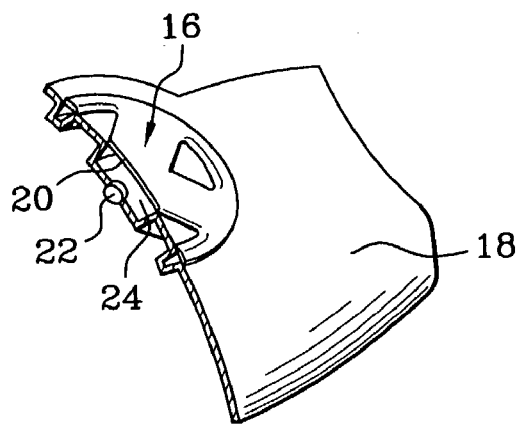
FIG. 2 shows a portion of one of the pieces of styling of FIG. 1 in perspective and in section on plane AA.

FIG. 2 shows in greater detail the second piece of styling 16 placed on the front wall 18, this view being in perspective and in section on the longitudinal axis AA of the motor vehicle 10.

This figure shows that the piece of styling 16 is fixed on the front wall 18, but differs therefrom in its outside surface which is painted in a color that is different from that of the front wall 18. The outside surface of the piece of styling 16 is preferably chromium-plated.

The piece of styling 16 has an outer skin 20 behind which there is placed a source of light 22, for example fixed in a housing 24 secured to the outer skin 20.

Figure 3:
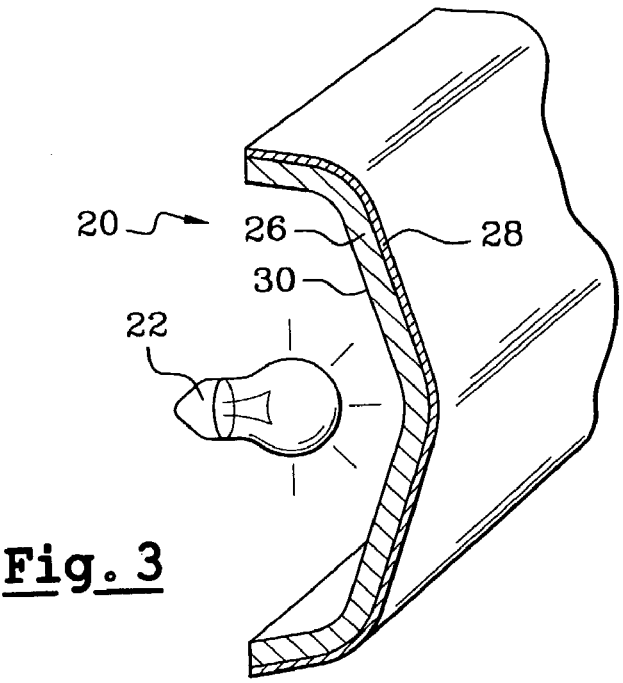
FIG. 3 is a diagram showing a detail of the piece of styling shown in FIG. 2.

FIG. 3 shows a detail of the outer skin 20 of the piece of styling 16.

It is made of a transparent material 26, for example a rigid plastics material, whose visible outside surface 28 is chromium-plated and whose inside surface 30, opposite from the outside surface has a surface state suitable for diffusing light. For example it may be frosted.

Thus, since the light source 22 is situated behind the outer skin 20 of the piece of styling 16, i.e. facing the inside surface 30, when the light source 22 is switched on, the light that it emits is diffused by the frosted inside surface 30, passes into the transparent material 26, and through its metal-plated surface 28 that is visible from the outside.

When the light source 22 is switched on, e.g. at night, the piece of styling 16 is thus made more visible for an observer situated outside the vehicle.

In contrast when the light source 22 is switched off, it is invisible from the outside because of the existence of the chromium-plated surface 28 which is semi-reflecting (it allows light to pass in one direction only).

It can clearly be seen that the piece of styling of the invention improves its own visibility for an observer situated outside the vehicle, particularly at night.

As explained above, the piece of styling may comprise a logo, a monogram, or any other type of marking.

What is claimed is:

1. A piece of styling, intended to be fixed on a body work part of a motor vehicle, the piece of styling comprising:
 an outside skin that is disposed in a visible manner on the body work part of the vehicle, wherein said outside skin has an outside surface that allows light to pass in one direction only.

2. A piece of styling according to claim 1, wherein the outside skin is made of a transparent material and has a visible outside surface that is chromium-plated.

3. A piece of styling according to claim 1, wherein the outside skin has an inside surface opposite from its outside surface and having a surface state that diffuses light.

4. The use of a piece of styling according to claim 1 as a logo.

5. The use of a piece of styling according to claim 1 as a monogram.

6. A motor vehicle having a piece of styling according to claim 1.

* * * * *